Dec. 2, 1958 H. W. DENISON ET AL 2,862,679
SPINNING REEL
Filed Dec. 6, 1955 2 Sheets-Sheet 1
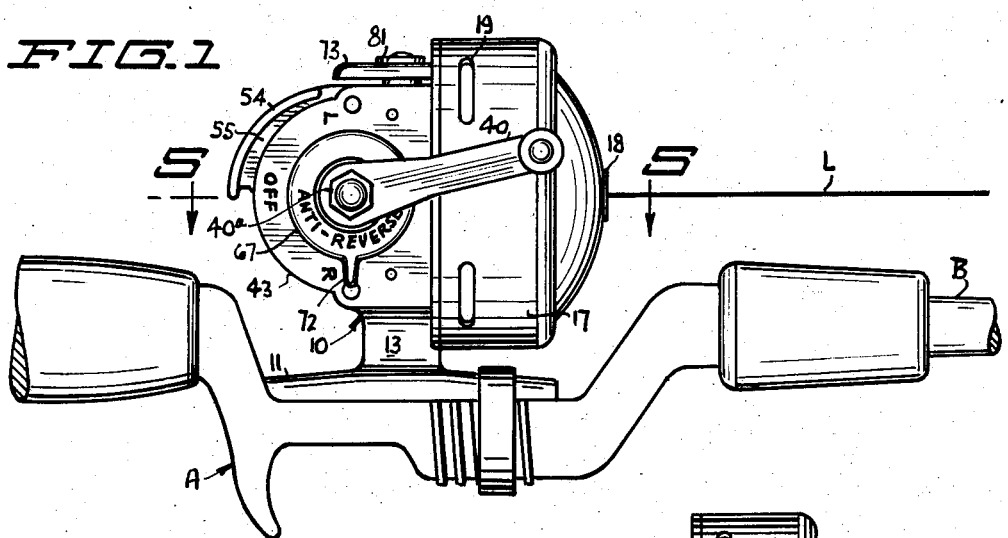
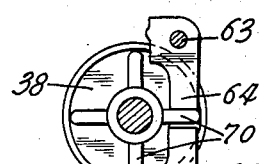
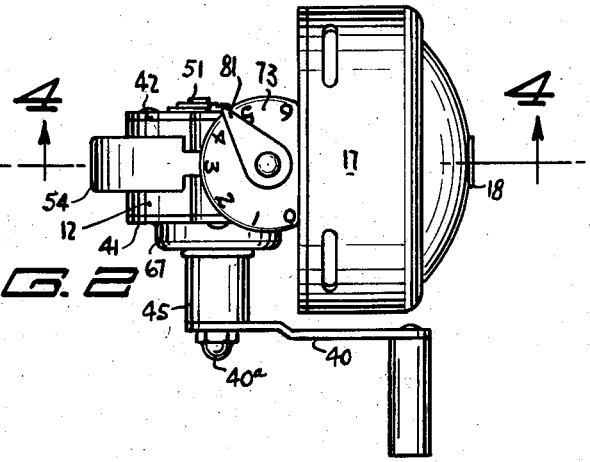
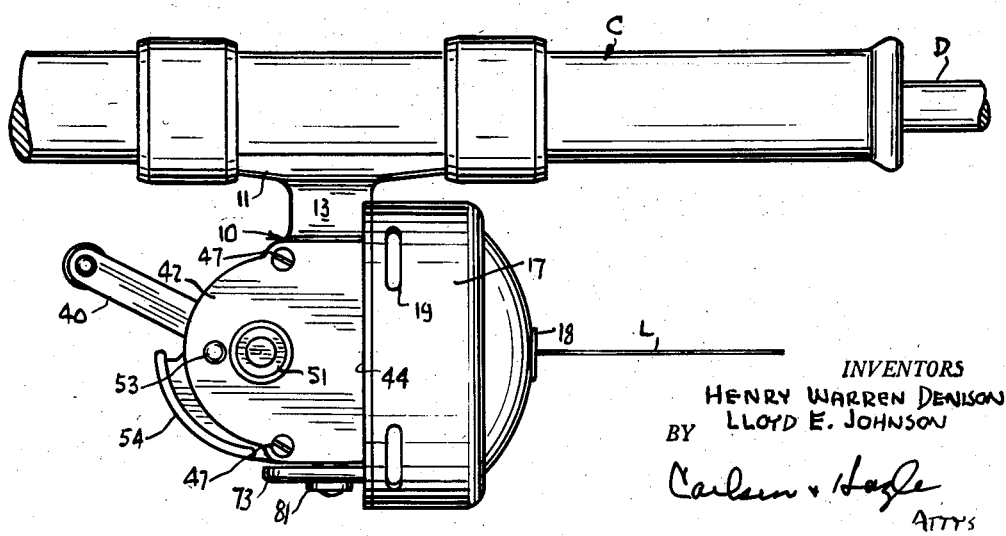
INVENTORS
HENRY WARREN DENISON
LLOYD E. JOHNSON
BY
Carlsen + Hagle
ATTYS

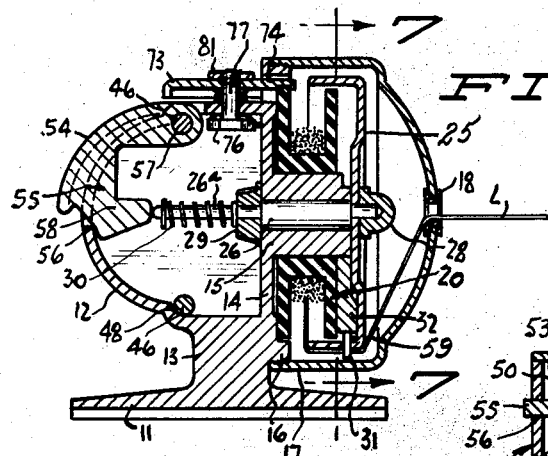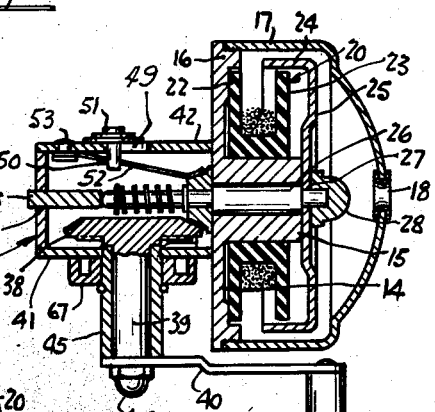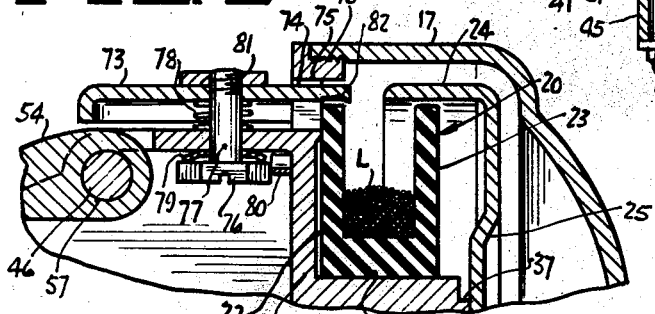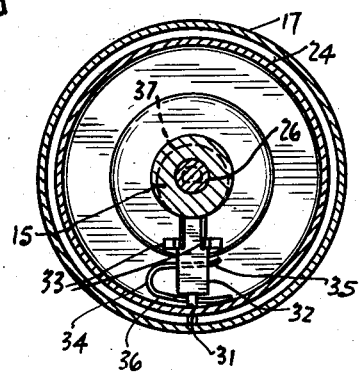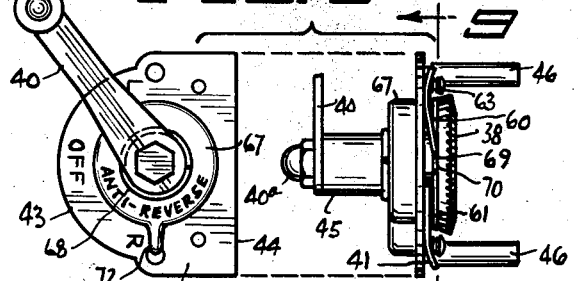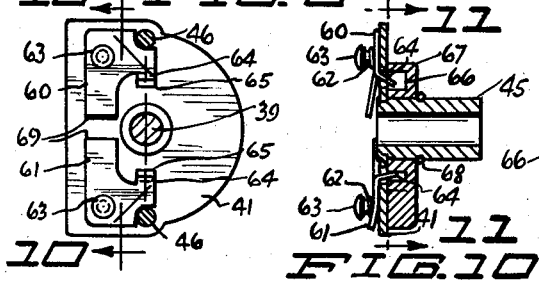

United States Patent Office 2,862,679
Patented Dec. 2, 1958

2,862,679

SPINNING REEL

Henry Warren Denison and Lloyd E. Johnson, Mankato, Minn.; F. Evelyn Denison, special administratrix of the estate of said Henry Warren Denison, deceased Application December 6, 1955, Serial No. 551,297

6 Claims. (Cl. 242—84.2)

Our invention relates to improvements in fishing reels of the type known as spinning reels and in which the reel spool does not revolve in paying off the line to cast a line, and, therefore, cannot backlash. In some respects the present reel is similar to those disclosed in our Patents Nos. 2,644,647 of July 7, 1953, and 2,667,312 of January 26, 1954, particularly with regard to the manner in which the line is released and then picked up and wound up on the spool.

The primary object of our present invention is to provide a spinning reel which is adaptable to right or left hand operation, on bait casting, fly casting or spinning rods and which therefore permits the dealer to meet demands for several different types of reels merely by adjusting our reel to suit the particular type of operation desired. To this end the line carrying spool is reversible in the reel so that the line carried on the spool may pay off in either direction and be wound back on in either direction. In addition the reel handle may be shifted from one side of the reel to the other and an anti-reverse mechanism is provided so that the handle may be adjusted, at the option of the user, to turn only in one direction to wind the line onto the spool.

Another and important object of our invention is to provide an improved adjustable drag engaging the spool and permitting the same to turn and the line to pay out when the tension on the line exceeds a value preset by adjustment of the drag mechanism. The drag setting is precise and is indicated by a calibrated dial and pointer so that the restriction against rotation of the spool may be adjusted with reference to the breaking strength of the line, a very desirable feature in playing fish of any substantial size.

Still another object is to provide a reel of this general type which is compact and neat in appearance, simple and durable in construction and in which the various controls and adjustments are all conveniently located and readily adjustable according to need.

These and other more detailed and specific objects will be disclosed in the course of the following specification, reference being had to the accompanying drawings, in which—

Fig. 1 is a side elevation of our improved reel in the position it will assume above the handle when fastened to a rod of the bait casting variety.

Fig. 2 is a top plan view of the reel, as seen in Fig. 1, but omitting the rod.

Fig. 3 is a side elevation of the same reel as applied to a spinning type of rod, in which case the reel is located beneath the handle and the operating crank for the reel is, therefore, upon the far side of the reel as here viewed.

Fig. 4 is a longitudinal vertical sectional view through the reel taken substantially along the line 4—4 in Fig. 2.

Fig. 5 is a similar but horizontal sectional view through the reel.

Fig. 6 is an enlarged fragmentary detail section through the upper part of the reel as it appears in Fig. 4 and particularly illustrating the relationship of the drag to the spool and adjacent parts of the reel.

Fig. 7 is a diametrical sectional view taken substantially along the line 7—7 in Fig. 4 and in particular illustrating the spooling member, the line pick-up pin and the relationship of the latter to the cam upon the bearing forming part of the frame of the reel.

Fig. 8 is a composite enlarged side view and end view of one of the side plates of the reel with which is associated the crank, the drive gear and the anti-reverse or one-way clutch mechanism.

Fig. 9 is an inside elevational view of the side plate taken substantially along the line 9—9 in Fig. 8 and showing the clutch dogs.

Fig. 10 is a diametrical sectional view through the anti-reverse mechanism taken substantially along the line 10—10 in Fig. 9.

Fig. 11 is an inside elevational view of the adjustment cam for the anti-reverse mechanism taken along the line 11—11 in Fig. 10.

Fig. 12 is an elevational and sectional detail view, substantially along the same line as indicated for Fig. 9 but in a direction opposite the arrows, and showing the outer face of the drive gear, the studs or dog engaging members on this gear and adjacent portions of the dogs themselves.

Referring now more particularly and by reference characters to the drawing, our improved reel comprises a frame designated generally at 10 which includes an elongated tang 11 by which the reel may be mounted upon the handle A of an ordinary bait casting rod B, as seen in Fig. 1, or upon the handle C of a spinning rod D, as is shown in Fig. 3. In addition the reel is adapted to use upon a fly casting type of fishing rod and it will be noted that when used on the bait casting rod the reel is located above the handle and forward of the hand grip E, whereas on the spinning rod D the reel is located below the handle C and is mounted directly thereupon. In the case of the flyrod, which is not here shown since its construction is well known in the art, the reel is again located below the handle but is located to the rear on the hand grip as will be readily understood. The frame 10 includes an arcuate housing wall 12 connected to the aforesaid tang 11 by a stem portion 13 providing clearance for the fingers of the hand where the reel is used upon a spinning rod in the usual manner. The housing wall 12 extends in a rearward direction and forwardly thereof the reel has a circular end plate 14 formed with a stationary tubular center bearing 15 extending in a forward direction. In addition the end plate 14 is provided with a peripheral forward flange or extension 16, the outer surface of which is threaded for the removable mounting thereon of a reel cover 17, the rear portion of which is cylindrical in shape, as clearly shown but the forepart of which is rounded toward the center whereat there is located a line guide or grommet 18. The cylindrical portion of the reel cover 17 has a series of openings 19 to permit air to circulate through the interior of the cover and dry the parts therein.

The fishing line L is wound upon a spool 20 having a hub 21 and spaced apart circular flanges 22—23, the hub having a center opening of such diameter as to nicely rotatably fit upon the bearing 15 with the rearmost flange 22 of the spool against the forward face of the end plate 14. The diameter of the spool is such that its rear flange 22 will fit within the aforesaid peripheral projection or flange 16 whereon the cover is screwed, as is clearly shown, and the line L may pay off the spool forwardly, inwardly and then forwardly again through the guide 18. Normally the spool does not rotate and the line simply pays off in coils as required so that there can be no trouble with backlashes in the operation of the reel. Actually the line flows off over the smooth cylindrical wall 24 of a line spooling member 25, said wall being larger in diameter than the adjacent flange of the spool and extending rearwardly over the spool a short distance as seen in Figs. 4–6. Said spooling member 25 is secured to the forward end of an actuating shaft 26 journaled through the bearing 15, the shaft where it passes through the spooling member having a flat to fit a correspondingly shaped center opening 27 in the spooling member so that the latter cannot turn independently upon the shaft. A coin slotted nut 28 is threaded upon the end of the shaft to hold the spooling member in place thereon.

Rearwardly of the circular end plate 14 the actuating shaft 26 has another flat formed upon it to non-rotatably engage the correspondingly shaped opening in a drive pinion 29 and cause said pinion to rotate with the shaft, as will be readily understood. However, the shaft 26 may slide through the pinion 29, and through the bearing 15, to move the spooling member 25 forwardly from its normal position in which it appears in Figs. 4 and 5. This forward movement of the shaft 26 and the spooling member 25 is yieldably opposed by an expansion coil spring 30 arranged upon the rearwardly extending end 26ª of the shaft and braced between the rear extremity thereof and the aforesaid pinion 29. Thus the spring 30 also serves to hold the pinion 29 forward in place against the rear surface of end plate 14. The manner in which the shaft 26 is operated will be presently set forth.

As in our two earlier patents the spooling member 25 is provided with a radially extending line pick-up pin or member 31 which normally projects outward through the wall 24 as seen in Fig. 4. Inwardly of said wall the pin 31 is pressed into a carrier 32 (Fig. 7) of a "plastic" material which is slidably held between lugs 33 pressed inward from the spooling member at opposite sides of the carrier, and the carrier is biased in an inward direction by a looped wire spring 34 one leg 35 of which penetrates the carrier while the other leg 36 engages the inside of wall 24. In the normal position of the spooling member 25 the inner end of the carrier 32 rides the circular end portion of the bearing 15 but when the shaft 26, and spooling member, are projected forwardly the carrier clears the bearing and the pick-up pin 31 is drawn inward flush with the wall 24 by action of the spring 34. In this condition of the reel the line L may flow smoothly off the spool 20 as will be apparent. When the shaft 26 and spooling member 25 are moved rearward by the spring 30, and rotated a part turn, the inner end of carrier 32 rides up a narrow cam surface 37 on the extremity of the bearing 15 until the pickup pin 31 again projects whereupon rotation of the spooling member in the proper direction will respool the line upon the spool as in our earlier patents. The cam surface 37 is symmetrical so that the carrier 32 will be returned to its normal position on rotation of the spooling member in either direction.

The shaft 26 is rotated by a drive gear 38 which meshes with the pinion 29 and this gear is connected by a shaft 39 to a crank or handle 40 held in place by a crank nut 40ª and located at one side of the reel frame 10. Side plates 41—42 are provided to close the opposite sides of the housing wall 12 of the frame 10, these side plates being identical in shape with arcuate margins 43 to fit the contour of the wall 12 and straight forward edges 44 to fit against the rear of the end plate 14. The side plate 41 has a hollow bearing 45 wherein the shaft 39 is journaled and the two side plates are secured in place by cross studs 46 secured to the side plate 41, just clearing the gear 38, and which extend toward and meet the opposite side plate 42. The latter has registering openings through which screws 47 are screwed into the studs 46 and thus the screws and studs serve to hold the side plates tight against the side of the housing 12. The latter has notches 48 (Figs. 4, 6) where the studs 46 pass so that the side plates cannot shift in any direction forwardly—rearwardly or upwardly—downwardly when the screws 47 are pulled tight.

The side plate 42 has a forwardly-rearwardly elongated slot 49 in which is slidably mounted the stem 50 of a click button 51. Inwardly of the side plate the stem 50 is apertured to slidably engage a click spring 52 of spring wire, secured by a rivet at 53 at its rear end to the inner surface of the side plate. From this point the spring 52 angles inwardly and forwardly and when the click button 51 is drawn rearwardly the forward end of the spring will engage the pinion 29 on the side opposite that engaged by the drive gear 38 in which position the spring will serve the usual function of a click in fishing reels. When the click button 52 is pushed forwardly it draws the forward end portion of the click spring outward to clear the pinion as will be readily understood.

The actuating shaft 26 is moved lengthwise to position the spooling member 25 by means of a thumb piece 54 of general arcuate configuration, located at the rear of the housing 12 and having a center narrower rib 55 projecting inwardly through an elongated slot 56 formed in the housing. At one end the rib 55 has an aperture 57 by which the thumb piece is pivotally mounted on one of the aforesaid studs 46, and at the opposite end the rib has a projecting lug 58 which bears against the rear end of the shaft 26 and forms means for moving that shaft. The arrangement is thus such that the fisherman may rest his thumb (in the case of the bait casting rod B or finger where the reel is used on other kinds of rods) upon the thumb piece 54 and by pressure thereon project the shaft 26 forwardly to free the pick-up pin from the cam 37 so that the line may be cast, but by pressing hard enough will cause the rim 59 (Fig. 4) of the spooling member 25 to grip the line at the inside of the cover 17 to thereby control the cast. When pressure on the thumb piece is released and the crank 40 turned the cam 37 will then re-project the pick-up pin 31 to spool the line again.

The crank 40 and drive gear 38 may be locked against rotation in either direction by a double anti-reverse or one-way clutch mechanism best shown in Figs. 8–11. The same comprises a pair of spring metal dogs 60—61 held on the inside of side plate 41 by coil springs 62 on headed pins 63. Each dog has an actuating end 64 turned outwardly loosely through openings 65 in the side plate and extending into an annular channel 66 in an actuating cam 67 rotatably mounted about the bearing 45, on the outside of the side plate, and held in place by a snap ring 68. The springs 62 tend to rock the facing ends 69 of the dogs 60—61 inward away from the side plate 41, as see the position of dog 60 in Fig. 10, and in such position the ends 69 are in the path of short studs or tooth means 70 on the outside of drive gear 38. The channel 66 has a cam surface 71 and in one position of cam 67 the dog 60 will be in position to lock the drive gear 38 against rotation in one direction (by engaging one of the studs 70), in another position will similarly cause dog 61 to lock the gear against rotation in the opposite direction, and in an intermediate position will hold both dogs retracted so that the drive gear may turn freely in both directions. The cam 67 has a pointer 72 (Figs. 1, 8) and the outside of the side plate 41 carries "R," "L" and "Off" indicia to indicate the condition of the anti-reverse mechanism and the direction in which the drive gear and crank may turn. A web 67ª (Fig. 11) contacts the ends 64 of the dogs to limit movement of the cam.

Rotation of the spool 20 is permitted, so that line may pull off of the same even with the pick-up pin 31 projected as is sometimes necessary in playing a large fish, but such rotation is restricted by an adjustable drag mechanism which will now be described. A drag member or dial plate 73 is provided and the same is partially circular but has a spool engaging end 74 projecting forwardly through an opening 75 (Fig. 6) in the end plate 14 and overlying the rim of the adjacent flange 22 of the line spool 20. The opening 75 is so dimensioned that the end 74 of the drag plate may move radially with respect to the axis of the spool. The head 76 of a cap screw 77 which projects loosely through the adjacent housing wall 12 is located inside the wall and the screw is tapped into the pointer 81. The screw 77 passes loosely through the dial plate 73. Located on the screw 77 between wall and dial plate is an expansion coil spring 78 which normally biases the latter in a radial direction away from the axis of the spool and shaft 26. One or more bowed spring washers 79 are disposed between the head 76 of the screw and inside of wall 12 and this screw head, which is other than circular in shape but has the usual kerf, is normally held against rotation when up against the inside of the wall 12 by stops 80. As stated a pointer 81 is threaded on the screw 77 and plays over a scale of numerals or other indicia on the exposed face of the drag plate 73 as seen in Fig. 2. Where the end 74 of the drag plate crosses the rim of the spool flange 22 there is formed a very shallow groove 82 as seen in Fig. 6.

In the operation of the reel the crank 40 is turned to wind the line L on the spool 20 and the anti-reverse mechanism is so positioned that the handle may properly turn in this direction. The proper direction of rotation for re-spooling the line will, of course, depend upon the direction in which the line is wound on the spool and the same may be readily removed and reversed on the bearing 15 when desired. Not only can the direction of rotation of the crank be reversed but it may be changed from one side of the reel to the other merely by removing the screws 47 and reversing the side plates 41—42 from one side of the reel to the other. These adjustments will make the reel suitable to use by either a right or left handed person and upon any type of fishing rod, reducing the number and styles of reels it is necessary for the dealer to carry in stock to meet all demands, all as will be understood.

The position of the drag pointer 81 will determine and designate the amount of frictional drag exerted on the rim of the spool flange 22 by the end 74 of the drag plate, turning the pointer clockwise, as viewed in Fig. 2, screwing the pointer onto the screw and thus pulling the end 74 down tighter upon the flange rim, and vice versa. In removing the spool 20 to reverse it or to change to another carrying another line the drag is adjusted to the zero or "off" position so that the flange rim may slip from the shallow groove 82. By pressing downward, as viewed in Fig. 6, upon the drag plate 73 the screw head 76 will clear the stops 80 and the head can then be adjusted to vary the range of drag pressures exerted on the spool rim in the various positions of the pointer 81, also as will be understood.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a fishing reel, a frame, a line spool on the frame, means for spooling a line on the spool and including a shaft and a pinion, a pair of side plates on the frame, one of said side plates having a bearing, a crank rotatable about the bearing, a drive gear operated by the crank and meshing with one side of the pinion to spool the line, an anti-reverse mechanism including a pair of opposed spring biased dogs mounted on the side plate adjacent the said drive gear, the drive gear having at least one stud facing said dogs, and a cam on the outer surface of the side plate manually adjustable from outside the reel and engaging the dogs to position either in the path of said stud and thereby limit rotation of the drive gear and crank to either one direction or the opposite direction.

2. In a fishing reel, a frame, a line spool on the frame, means for spooling a line on the spool and including a shaft and a pinion, a pair of side plates on the frame, one of said side plates having a bearing, a crank rotatable about the bearing, a drive gear operated by the crank and meshing with one side of the pinion to spool the line, an anti-reverse mechanism including a pair of opposed spring biased dogs mounted on the side plate adjacent the said drive gear, the drive gear having at least one stud facing said dogs, a cam on the outer surface of the side plate manually adjustable from outside the reel and engaging the dogs to position either in the path of said stud and thereby limit rotation of the drive gear and crank to either one direction or the opposite direction, and the cam having an intermediate position in which both dogs are retracted clear of the stud and the crank and drive gear can turn in both directions.

3. In a fishing reel, a frame, a line spool on the frame, means for spooling a line on the spool and including a shaft and a pinion, opposed side walls on said frame, one of said side walls having a bearing, a crank having a crankshaft rotatable in the bearing, a drive gear operated by the crank and meshing with one side of the pinion to spool the line, an anti-reverse mechanism operative to restrict rotation of the crank to one of two opposite directions and also to free the crank to rotate in either direction, said mechanism including selectively operative ratchet means between said side wall and said drive gear, said ratchet means including gear engaging elements on opposite sides of the axis of said crankshaft, a control element for said anti-reverse mechanism located outside of the bearing carrying side wall and coaxially with the said bearing, and means operated by said control element for selectively engaging a desired gear engaging element with said drive gear, or for disengaging both of said gear engaging elements.

4. In a fishing reel, a frame, a line spool on said frame, means for spooling a line on said spool, said frame having a housing thereon, one side wall of said housing having a bearing therein, said wall having an inner and an outer face, a crankshaft rotatable in said bearing and operatively connected to said line spooling means, a dog engaging member adjacent said inner face of said side wall and mounted on and rotated by said crankshaft, an anti-reverse mechanism including a pair of opposed spring biased dogs mounted on said side wall adjacent said dog engaging member, said dog engaging member having tooth means facing said dogs, and a cam on the outer face of said side wall manually adjustable from outside of the reel and engaging the dogs to position either in the path of said tooth means and thereby limit rotation of the dog engaging member and crank to either one direction or the opposite direction.

5. In a fishing reel, a frame, a line spool on said frame, means for spooling a line on said spool, said frame having a housing thereon, one side wall of said housing having a bearing therein, said wall having an inner and an outer face, a crankshaft rotatable in said bearing and operatively connected to said line spooling means, a dog engaging member adjacent said inner face of said side wall and mounted on and rotated by said crankshaft, an anti-reverse mechanism including a pair of opposed spring biased dogs mounted on said side wall adjacent said dog engaging member, said dog engaging member having tooth means facing said dogs, and a cam on the outer face of said side wall manually adjustable from outside of the reel and engaging the dogs to position either in the path of said tooth means and thereby limit rotation of the dog engaging member and crank to either one direction or the opposite direction, and the cam having an intermediate position in which both dogs are retracted clear of the tooth means and the crank and dog engaging member can turn in both directions.

6. In a fishing reel, a frame, a line spool on said frame, means for spooling a line on said spool, said frame having a housing thereon, one wall of said housing having a bearing therein, said wall having an inner and outer face, a crankshaft rotatable in said bearing and operatively connected to said line spooling means, a dog engaging member adjacent the inner face of said side wall and mounted on and rotated by said crankshaft, an anti-reverse mechanism operative to restrict rotation of the crank to one of two opposite directions and also to free the crank to rotate in either direction, said mechanism including selectively operative dog means between said inner face and said dog engaging member, said dog means including dogs on opposite sides of the axis of said crankshaft, a control element for said anti-reverse mechanism located outside of the bearing carrying side wall and coaxially with the said bearing, and means operated by said control element for selectively engaging a desired dog with said dog engaging member, or for disengaging both of said dogs.

References Cited in the file of this patent

UNITED STATES PATENTS

| | | |
|---|---|---|
| 447,496 | Slade | Mar. 3, 1891 |
| 2,486,043 | Lofgren | Oct. 25, 1949 |
| 2,558,896 | Young et al. | July 3, 1951 |
| 2,571,028 | Gerry | Oct. 9, 1951 |
| 2,641,419 | Cowen | June 9, 1953 |
| 2,649,258 | Shelburne | Aug. 18, 1953 |
| 2,668,025 | Hull | Feb. 2, 1954 |
| 2,675,192 | Hull | Apr. 13, 1954 |
| 2,690,309 | Cuonz | Sept. 28, 1954 |
| 2,705,113 | Bonanno | Mar. 29, 1955 |
| 2,706,095 | Goodall | Apr. 12, 1955 |
| 2,712,419 | Martini | July 5, 1955 |
| 2,719,680 | Denison | Oct. 4, 1955 |